United States Patent
Hoddie

(10) Patent No.: US 10,341,689 B1
(45) Date of Patent: Jul. 2, 2019

(54) WEIGHTED RUNLENGTH ENCODING

(71) Applicant: Moddabel Tech, Inc., Menlo Park, CA (US)

(72) Inventor: J. Peter Hoddie, Menlo Park, CA (US)

(73) Assignee: Moddable Tech, Inc.

( * ) Notice: Subject to any disclaimer, the term of this patent is extended or adjusted under 35 U.S.C. 154(b) by 0 days.

(21) Appl. No.: 15/603,350

(22) Filed: May 23, 2017

(51) Int. Cl.
*G09G 5/36* (2006.01)
*H04N 19/93* (2014.01)
*H04N 19/132* (2014.01)
*G09G 5/22* (2006.01)
*G06F 3/044* (2006.01)

(52) U.S. Cl.
CPC ............ *H04N 19/93* (2014.11); *G09G 5/227* (2013.01); *H04N 19/132* (2014.11); *G06F 3/044* (2013.01); *G09G 2340/02* (2013.01); *G09G 2340/145* (2013.01)

(58) Field of Classification Search
CPC ........... G06T 9/005; G06T 9/00; H04N 19/93; H04N 1/642; H04N 1/644; H04N 2201/33378
See application file for complete search history.

(56) References Cited

U.S. PATENT DOCUMENTS 6,301,389 B1 * 10/2001 Penna .................... G06T 9/005
  382/232
6,707,939 B1 * 3/2004 Weinholz ............... G06T 9/005
  382/164

* cited by examiner

*Primary Examiner* — Hau H Nguyen
(74) *Attorney, Agent, or Firm* — intellipat; Edward W. Scott

(57) ABSTRACT

A weighed run-length encoding and decoding method and related devices and encoded bitstream. The encoded bitstream can comprise one or more of the following: a skip command packed into a nybble, the skip command indicating how many transparent pixels which are inserted into the bitstream, wherein there is up to a maximum number of transparent pixels; a solid command packed into a nybble, the solid command indicating how many solid pixels should be inserted into the decoded bitstream, wherein there are up to the maximum number of solid pixels; and a quote command packed into a nybble, the quote command indicating how many quoted pixels should be inserted into the decoded bitstream, wherein there are up to the maximum number of quoted pixels.

41 Claims, 7 Drawing Sheets

Figure 2: Software architecture

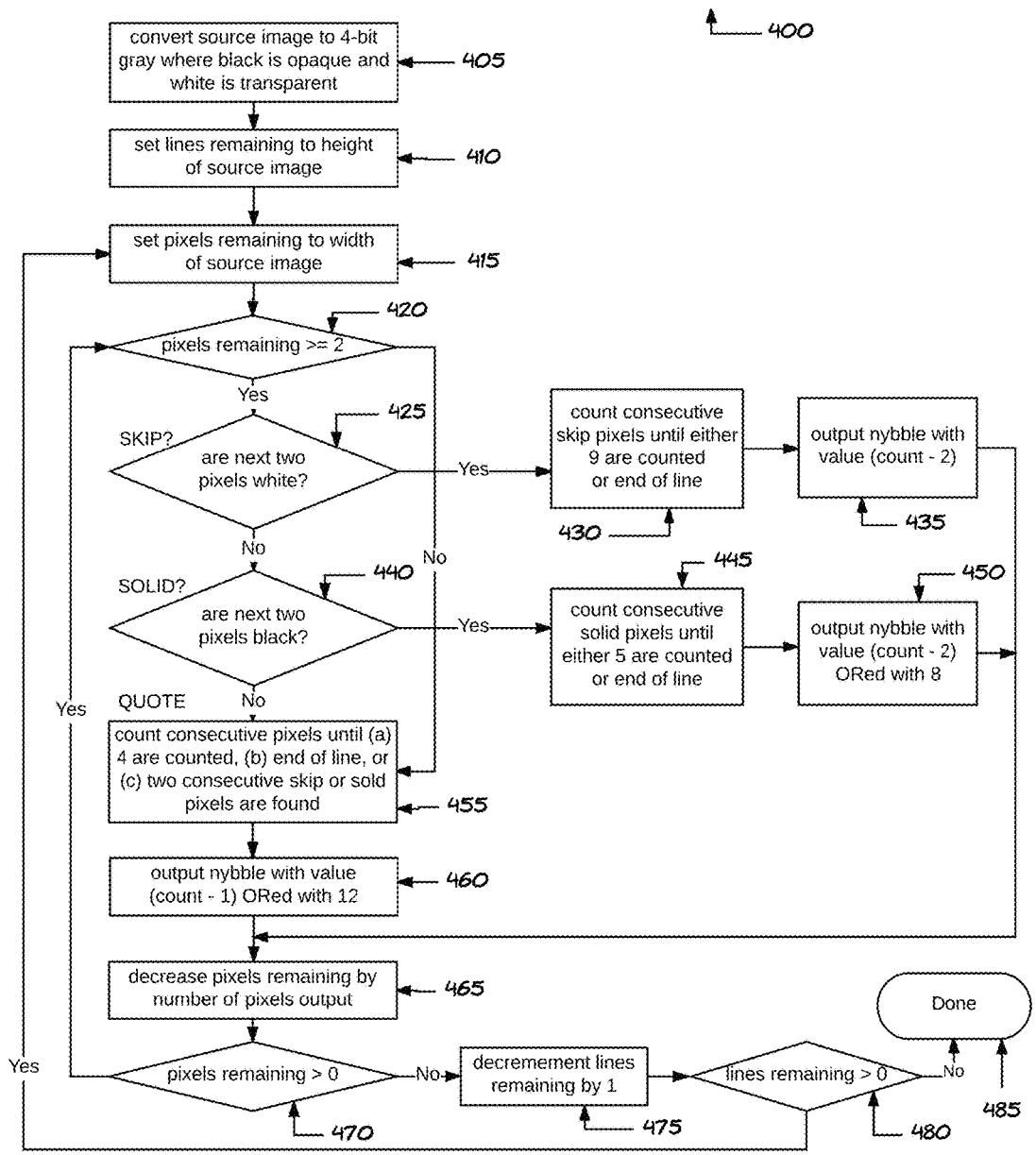
Figure 4: Encoding weighted RLE bitstream

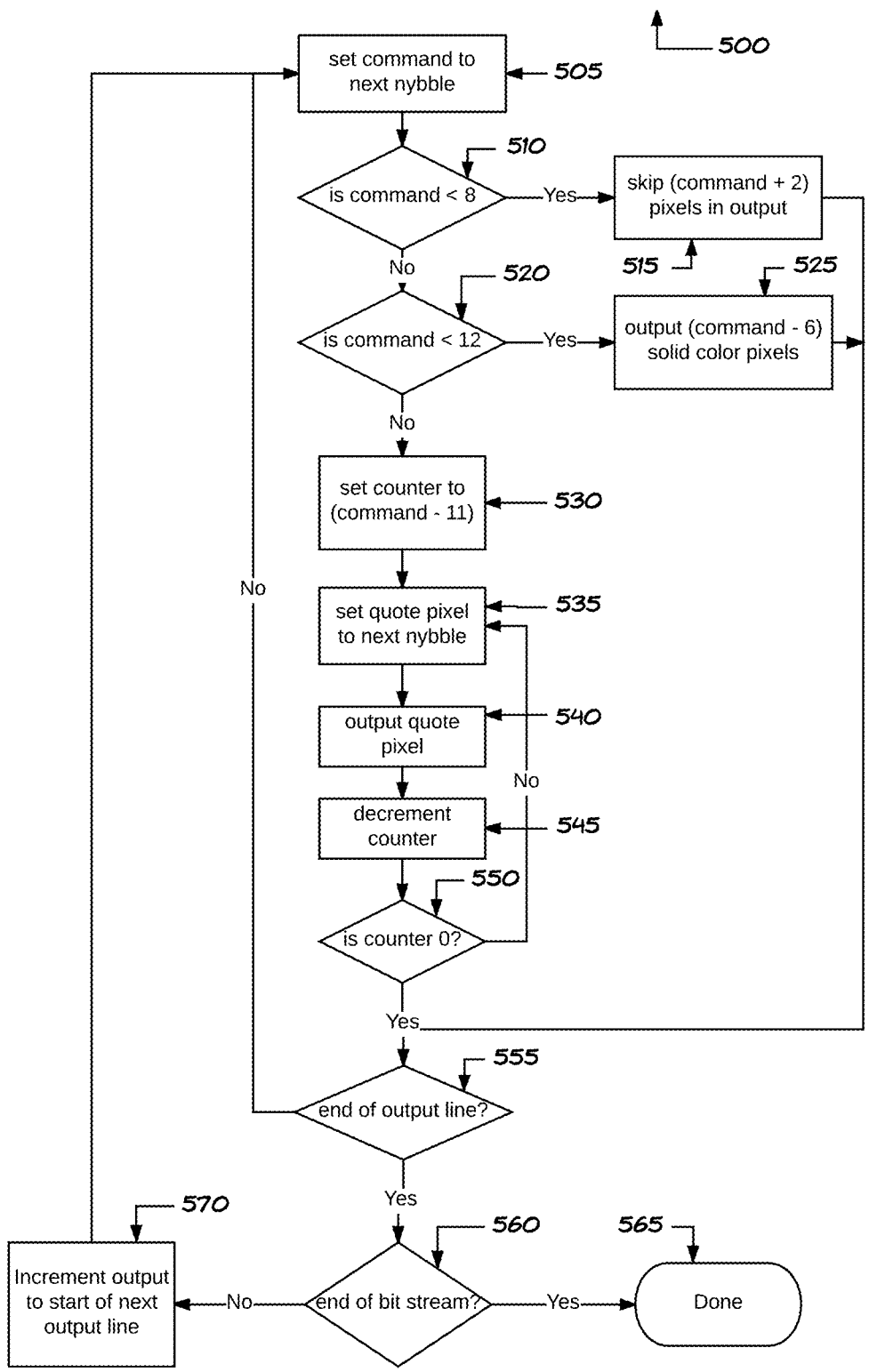
Figure 5: Decoding weighted RLE bitstream

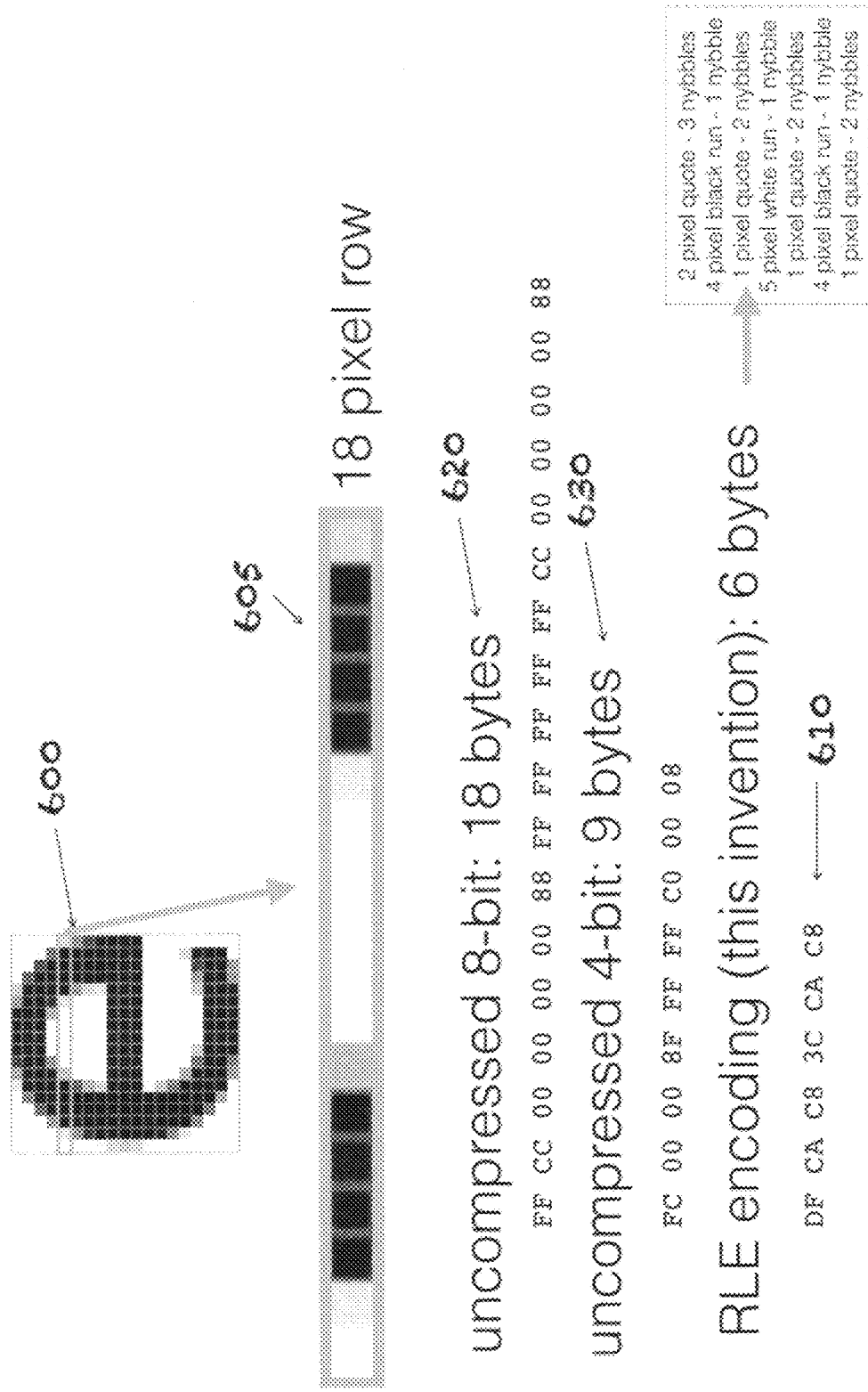

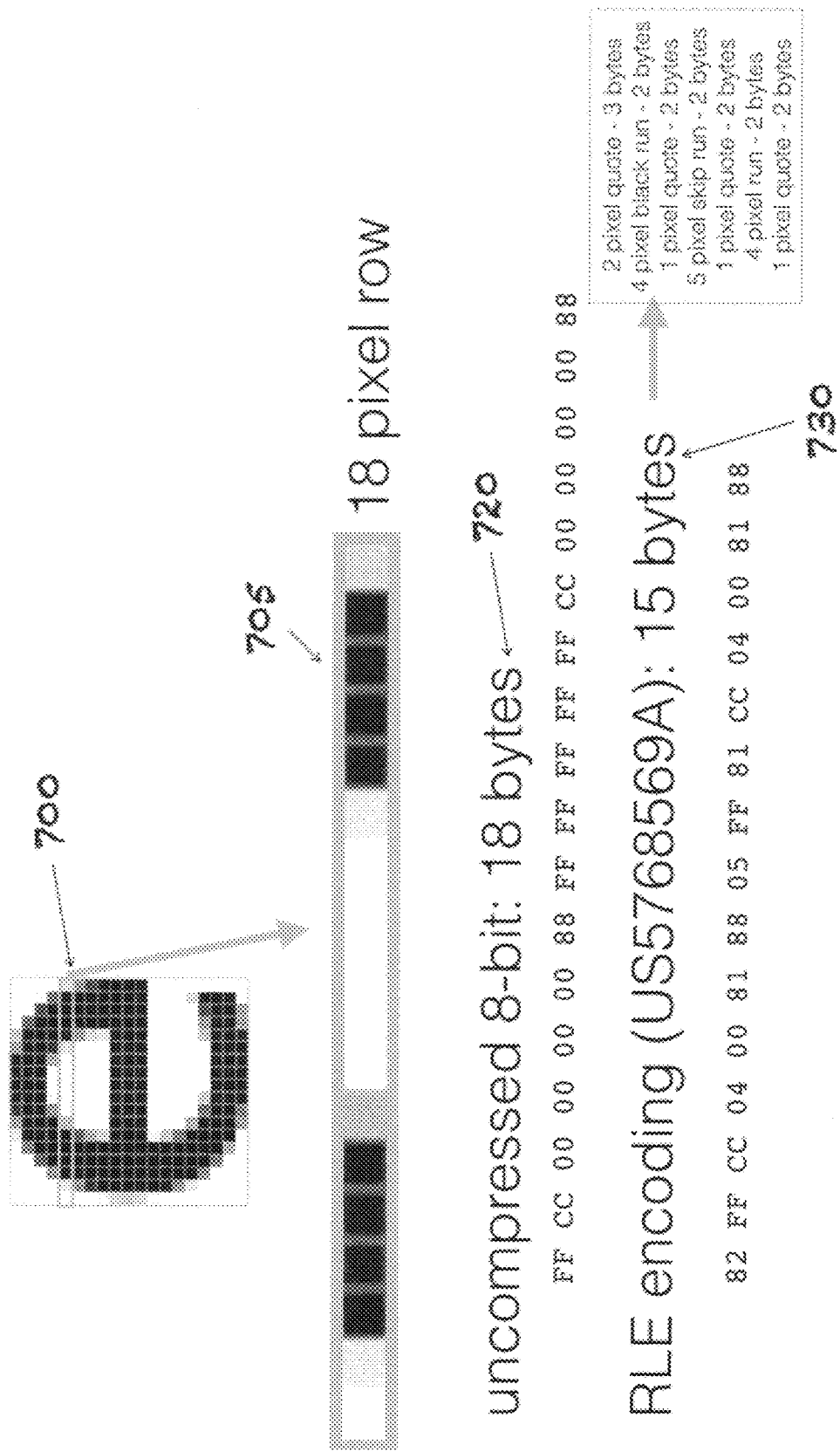

US 10,341,689 B1

WEIGHTED RUNLENGTH ENCODING

FIELD OF THE INVENTION

The present invention is related to the field of runlength encoding of bitmaps, such as masks and glyphs.

BACKGROUND

Image masks can be large, typically requiring 8-bits (one byte) per pixel. An image with 240×60 dimensions requires 14,400 bytes to for an uncompressed mask. This is entirely practical on mainstream computers and mobile devices, which have gigabytes of RAM and storage. However, for embedded devices (e.g. IoT devices) with limited RAM (48 KB) and ROM (1 MB), this easily becomes too large for practical use. For storage, the mask may be compressed. One common way to do this is using the PNG algorithm. The processing power and, in particular memory, required to run the PNG decoder (approximately 45 KB overhead) make it impractical on limited hardware with limited functionality.

One method of compression which is appropriate for limited capacity devices is U.S. Pat. No. 5,768,569 which uses a type of run-length encoding method. As shown in FIG. 7, a line 705 of a mask for a glyph 700 comprising 18 pixels can be represented, uncompressed, with 18 bytes 720. Using the methods described by this patent, the mask can be represented with 15 bytes 730. However, given the reduced of resolution on many small form factor displays used in certain limited power devices, even more compression is desired because such displays have limited display capability (resolution and/or color) in addition to the limited RAM and storage resources.

There therefore exists a need for higher compression for bitmaps in limited capacity devices

SUMMARY

Disclosed is a weighted run-length encoding and decoding method and related devices and bitstream. The encoded bitstream can comprise one or more of the following: a skip command packed into a nybble, the skip command indicating how many transparent pixels are inserted into the bitstream, wherein there are up to the maximum number of transparent pixels; a solid command packed into a nybble, the solid command indicating how many solid pixels should be inserted into the decoded bitstream, wherein there are up to the maximum number of solid pixels; and a quote command packed into a nybble, the quote command indicating how many quoted pixels should be inserted into the decoded bitstream, wherein there are up to the maximum number of quoted pixels.

BRIEF DESCRIPTION OF THE DRAWINGS

The novel features of the invention are set forth in the appended claims. However, for purpose of explanation, several embodiments of the invention are set forth in the following figures.

FIG. 4 shows an encoding process performed in embodiments of the present invention.

FIG. 5 shows a decoding process performed in embodiments of the present invention.

FIG. 6 shows an input bitstream and a coded bitstream created by embodiments of the present invention.

FIG. 7 shows an input bitstream and a prior art coded bitstream.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Figure 1:
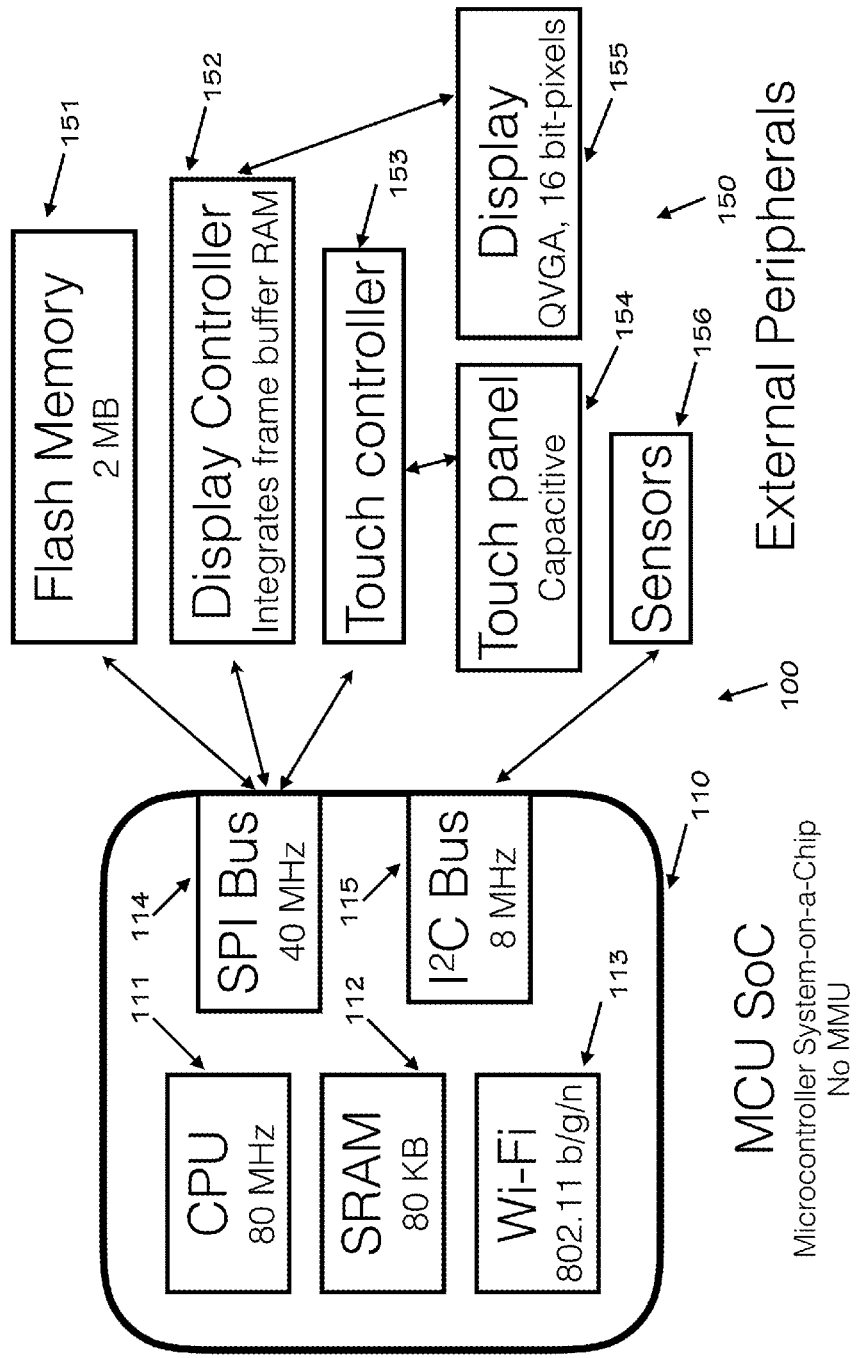
FIG. 1 shows a functional system block diagram of hardware components in embodiments of the present invention.

The present invention relates to encoding and decoding a bitstream which is used for pixel masks used in rendering (e.g. pixels of an image or glyphs). Such operations may be performed on a variety of devices, however, for the purposes of this disclosure certain hardware and software is employed to perform the encoding and decoding operations described. In these examples, the device is a limited capacity device, one which does not have a large quantity of RAM or Flash storage, and has limited computationally capacity A functional block diagram of hardware components of a device 100 such as an IoT device in which embodiments of the present invention may be implemented is shown in FIG. 1. Each functional block of device 100 is described and may include a combination of software, electronic, electrical and mechanical components. The specific design of the interaction of these components is design-dependent according to the designer's wishes and can be understood by those well-versed in the computer and electromechanical arts. Some unnecessary components are omitted in particular designs, FIG. 1 only describes one such implementation.

Device 100 comprises a microcontroller 110 which, in embodiments of the present invention, is a self-contained system-on-a-chip (SOC) programmed to perform the functions described in this disclosure herein. Such a microcontroller 110 may be a programmed general purpose computer with software loaded upon it for the functionality described herein, such as those widely available, which contain all the typical computer components—processors 111, memory 112 (on-chip volatile and non-volatile memory according to design such as SRAM), buses 114, 115 for interfacing with external components etc. . . . . In other embodiments, it may be dedicated logic. In some embodiments, microcontroller 110 includes a network interface, such as Ethernet or Wi-Fi such as various implementations of the 802.11 standard, such as b/g/and or n, according to design.

In embodiments of the present invention microcontroller 110 is an ARM type computer, such as a ARM Cortex-M3 CPU or Xtensa Instruction Set Architecture (ISA) Version 8 as used by the ESP8266 from Espressif, running a lightweight Real-Time Operation System (RTOS) such as FreeRTOS or Zephyr with all the associated functionality and custom software loaded thereupon during runtime. Of course, as is known to those skilled in the art, such a microcontroller may be implemented in any number of ways, such as by a so-called system-on-a-chip (SOC) (which contains an almost complete computer—CPU, volatile memory, non-volatile memory), gate arrays, state machines implemented in hardware or other apparatus capable of performing the functions recited herein. Functionality of the device can be provided by software executed by the microcontroller at the appropriate time (e.g. runtime or startup time), and from various sources known to those skilled in the art (e.g. local or remote non-volatile memory such as firmware or over a communications medium from a known or discovered source, such as Network Attached Storage, a server or over the internet).

Microcontroller 110 communicates with the various other functional components of device 100 through one or more buses 114, 115. This allows control and monitoring of the various components 150 of device 100, such as non-volatile (e.g. Flash) memory 151—etc. . . . . While such bus(es) 114 include relevant circuitry for communication and control of such devices 150, it is understood by those skilled in the art that certain devices may already communicate in the digital domain, while others are in the analog domain. The relevant circuitry for communication and control (e.g. digital to analog converters [DAC's]) may be distributed amongst each of the device(s) 150 and the buses 114, 115 or intermediate circuitry depending upon implementation. Of course, the functional components 150 may require relevant software either in the microcontroller 110 or the bus(es) 114, 115 for controlling such devices through software at runtime.

Bus 115 is also used to allow microcontroller 110 to communicate with various sensors 156 for monitoring device 100's status. These may include, but are not limited to, sensors for water and air temperature, water level, humidity, load, sound, light etc. . . . according to device 100's application. It would be understood by those skilled in the art that other sensors would be included depending upon the particular implementation.

Microcontroller 110 also communicates via bus 114 with user interface devices 150 for user control and monitoring of system 100 in embodiments of the present invention. Such user interface devices include display 155 coupled to a through a display controller 152 to the microcontroller, as well as sensing capability, such as capacitive or resistive touch panel 154 with accompanying touch controller 153 for single or multi-touch user functionality. As mentioned above, the display 155 and touch panel 154 may be collocated according to implementation. User interface devices 150 may include knobs, lights, buttons, switches, speakers, buzzers or other feedback devices, or other user input and output devices (not shown), according to implementation, such as for an IoT device.

Figure 2:
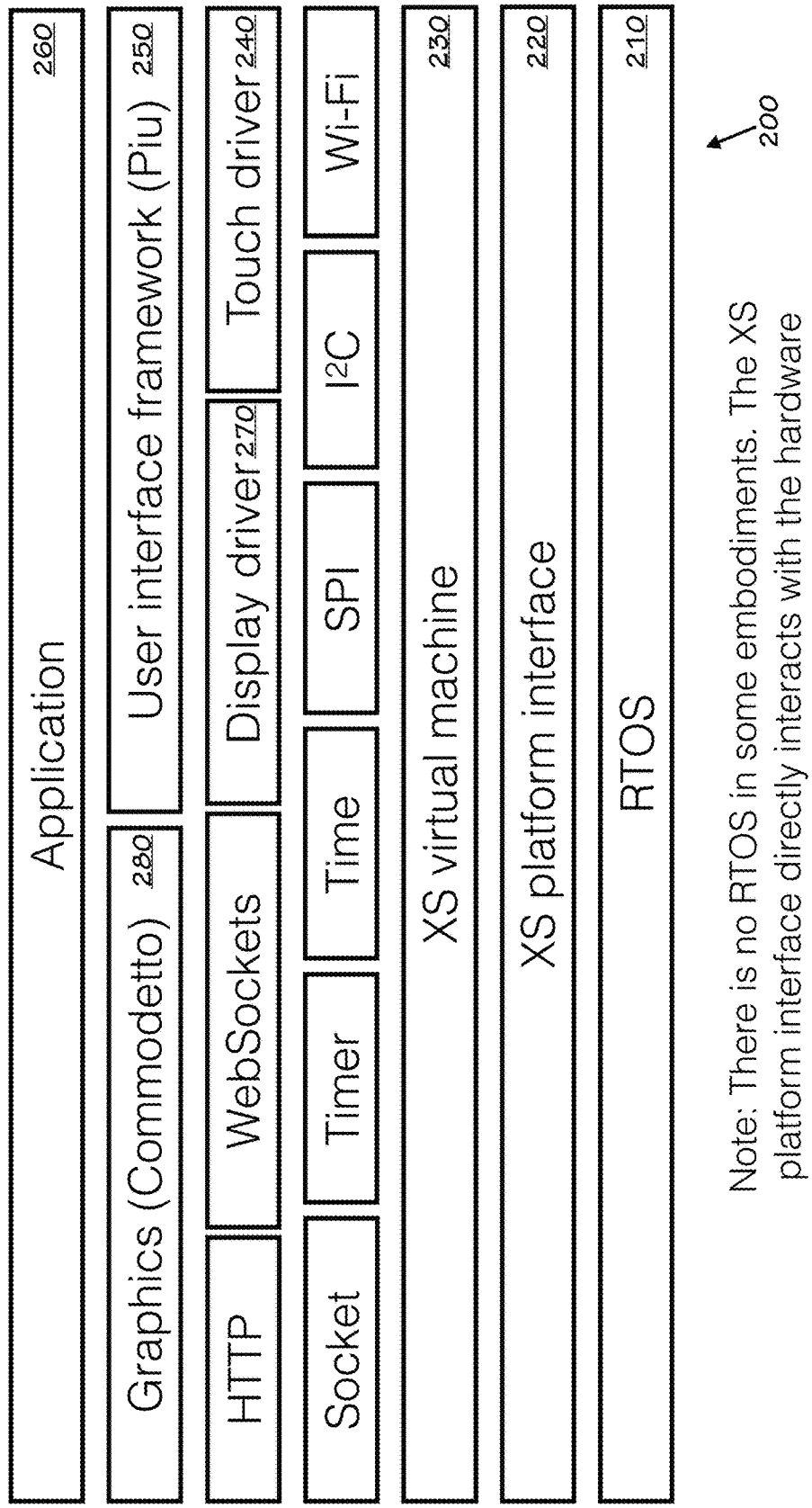
FIG. 2 shows a functional block diagram of the software components in embodiments of the present invention.

FIG. 2 is a diagram of the software architecture 200 in an implementation of an embodiment of the present invention. The software show here is illustrated as a stack for convenience showing a hierarchy of functionality and may be implemented as such, but one skilled in the art can understand it also can be a implemented as a collection of modules that communicate between certain one or more modules other in another implementation. For example, some modules (SPI, I2C) can communicate with the RTOS directly, and also depend on the XS virtual machine.

In implemented embodiments of the present invention, the device 100 runs both a Real-Time Operating System (RTOS) which is makes native calls to the functionality of the device, and an XS virtual machine, which in certain implementations, interprets and executes JavaScript at runtime. Depending on implementation the RTOS can be omitted for the most part where only the virtual machine will be present. Where both are present, the virtual machine communicates with the RTOS via a platform interface. Oftentimes, native functionality of the RTOS is used for time-critical tasks, such as rendering and/or display update.

In implementations of the present invention, one or more application(s) 260 can communicate with the RTOS 210 or the virtual machine 230 via various frameworks. These may include, for the purposes of this disclosure, touch and or display functionality provided by a user interface framework 250 such as Piu. User interface 250 does this by invoking display driver 270 and/or touch driver 250, in some embodiments by invoking the graphics library 280, such as Commodetto.

In some embodiments of the present invention, the encoding and decoding functions are coded in JavaScript and interpreted at runtime by XS virtual machine 230. In other embodiments, native C code can be used, either interpretively at run time or through reduction to object code which is native to the underlying architecture (e.g. a PC or the SOC). The functionality of the encoding and decoding functions may be present in any of the functional blocks shown in FIG. 2, however, in some embodiments such functionality is invoked by an application program 260 which calls the graphics library 280.

Figure 3:
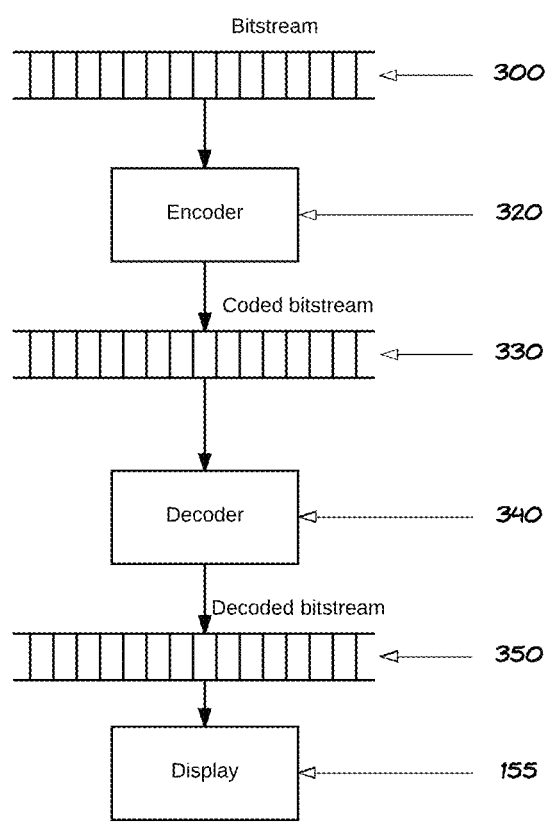
FIG. 3 shows a functional block diagram of an encoder, decoder and bitstreams in embodiments of the present invention.

As illustrated in FIG. 3, the present disclosure describes an encoder (or coder) and decoder. The encoder 320 and decoder 340 may be may be in separate devices, or the same device, when they are in the same service or in a single device they are collectively referred to as a codec (coder-decoder). Encoder 320 and decoder 340 may be implemented in any number of ways, including dedicated hardware of various forms or software as described above in device 100. In some embodiments of the present invention, encoder 320 can often be implemented in full capability computer at development time to develop encoded bitstreams (e.g. bit masks) such as 330 which can be used on a limited capability device 100 at runtime.

Encoder 320 operates on an input bitstream 310 and processes it to generate a coded bitstream 330, which may be a compressed version of the input bitstream 310. In embodiments of the present invention, input bitstream 310 is a series of pixels in an image or an image mask, such as the glyphs of a font.

A decoder 340 can operate upon coded bitstream 330 to generate a decoded bitstream 350. Decoded bitstream is an approximation of bitstream 310 according to embodiments of the present invention. Any of bitstreams 310, 330 or 350 can be reproduced, transmitted or stored, according to particular implementation.

Encoder

In embodiments of the present invention, encoder 320 initially processes an input bitstream such as 310 (e.g. pixel values) is to reduce the resolution of the image mask from 8-bits to 4-bits. While this results in some loss of quality, it is not perceptually significant in many situations with a lower-resolution display such 155 in FIG. 1. In particular, embedded devices are often connected to displays that use 16-bit pixels where the luminance of each color channel is only 5 (or 6) bits, meaning that at 4-bits the mask is only 1-bit below the resolution of the display. By reducing the resolution by half, the image mask size is also reduced by half, to 7200 bytes in this example. See FIG. 5.

Subsequently, in embodiments of the present invention, a weighted run-length encoding (RLE) encoding of the pixels in the mask is performed. Most prior art RLE compression algorithms consider each possible pixel value to be equally likely. This embodiment of the present invention recognizes that in a typical image mask the vast majority of pixels are either fully transparent (white) or fully opaque (black). Partially transparent pixels are typically only present around the edges of the mask, to provide anti-aliasing.

This embodiment of the present invention's weighted RLE encoding method uses a 4 bit (nybble) which can contain 3 possible command values: SKIP (there are a skip run); SOLID (a solid run); and QUOTE (a quote run) which map to commands given to the decoder. Two of these dedicated commands are for transparent and opaque pixels (SKIP and SOLID) followed by a value indicating the run of the SKIP or SOLID. These pixels are encoded as "runs" of consecutive pixels in embodiments of the present invention according to the value. In embodiments of the present invention, the SKIP and SOLID commands have a minimum count of 2 instead of 1 so a single command can store a longer run.

A third command QUOTE is used for any other types of pixels; all partially transparent pixels; and single pixel SOLID and SKIP instances (those that don't have a minimum count of 2). The QUOTE command is followed by a length (the nybble that contains the QUOTE command also includes the count), and 1-4 values of pixels encoded in nybbles.

The format of the three possible commands in each nybble in the bitstream according to embodiments of the present invention is one of the following:

SKIP: 0nnn (3 bits [nnn]—for 2 to 9 transparent pixels)
SOLID: 10nn (2 bits [nn]—for 2 to 5 unblended black pixels)
QUOTE: 11nn+VALUES(2 bits [nn] for length, VALUES is 1 to 4 pixel values packed into nybbles)

The SKIP and SOLID commands have no data following. The QUOTE command is followed by 1 to 4 nybbles of data for the mask pixels in the quote. The nybbles are packed in this embodiment of the present invention—a command may appear in the first or second nybble of a byte. Other embodiments may not pack the coded bitstream.

Each row of an image mask is encoded independently in embodiments of the present invention. The encoded nybbles are packed across rows, meaning that the first command of a scan line may begin in the middle of a byte. This approach saves, on average, one nybble per row of an image (30 bytes in our example). It also allows for an optimization in the decoder when rendering the image with clipping.

Applying this encoding algorithm to the sample image mask as shown in FIG. 6, the size of coded bitstream 610 is reduced to nearly 1,838 bytes, a reduction of 74.5% from the 4-bit uncompressed mask 630 and 87.2% from the 8-bit uncompressed mask 605. When applying this algorithm to the glyphs of a font (e.g. 600), each glyph is encoded separately.

The RLE encoding method of implemented embodiments is weighted in favor of images that have more runs of transparent pixels than opaque pixels (e.g. SKIP runs have a maximum length of 9 whereas SOLID runs have a maximum length of 5). An alternative embodiment of this invention could reverse the weighing for images which have more opaque runs than transparent.

The following is a JavaScript implementation of the encoder for one row of the image. The number of pixels in the row are in the "width" variable. The pixels for the image mask are stored in the Array named "scan" beginning at index "offset":

```
const solid=0;
const skip=15;
for (let remain=width, pos=offset; remain>0;) {
  if (remain>=2)}
    // check for skip run
    if ((skip==scan[pos]) && (skip==scan[pos+1])) {
      let count=2;
      while (((remain-count)>0) && (count<9) &&
          (skip==scan[pos+count])) count+=1;
      this.writeNybble(count-2);
      remain-=count;
      pos+=count;
      continue;
    }
    // check for solid run
    if ((solid==scan[pos]) && (solid==scan[pos+1])) {
      let count=2;
      while (((remain-count)>0) && (count<5) &&
          (solid==scan[pos+count])) count+=1;
      this.writeNybble(0x08|(count-2));
      remain-=count;
      pos+=count;
      continue;
    }
  }
  // quote
  let quoteLen=1;
  while (quoteLen<4) {
    if (remain<(quoteLen+2)) {
      quoteLen=Math.min(remain, 4);
      break;
    }
    if ((scan[pos+quoteLen]==scan[pos+quoteLen+1])
        &&
        ((solid==scan[pos+quoteLen])||(skip==scan[pos+
        quoteLen]))) break;
    quoteLen+=1;
  }
  this.writeNybble(0x0C|(quoteLen-1));
  for (let i=0; i<quoteLen; i++)
    this.writeNybble(scan[pos+i]);
  remain-=quoteLen;
  pos+=quoteLen;
}
```

This encoding algorithm of implemented embodiments is sufficiently simple so that it can be interpreted on a limited capacity device, such as 100, at runtime. In many embodiments, the encoding process itself can performed on a full-capacity computer (e.g. a PC not shown), such as at development time, with the encoded resulting bitstream 330 transferred to the limited capacity device (e.g. 100) for rendering at runtime.

Another embodiment of the encoding algorithm of the present invention is shown and described with reference to FIG. 4. While embodied in flowchart form, it is functionally equivalent to the code segment above in terms of the coded bitstream generated. Process 400 starts by converting the input value of the byte in the bistream to 4 bits at step 405. Then, a line counter is initialized by setting it to the number of lines (height of the gyph) from the input bitstream and, at step 410, a pixel counter is initialized at step 415 to the width of the source image. Step 420 then determines if the remaining pixels in the line are greater than or equal to 2 to abort and go to QUOTE processing at step 455.

Further processing continues to determine if a SKIP command is indicated at step 425 which determines whether the next two pixels are white. If so, then step 430 counts the number of consecutive pixels in the line which are white. This is done until either 9 are counted (maximum for a SKIP command) or the end of line is reached. In either event, at step 435, a nybble is output with to the adjusted pixel count of the pixel count-2 into the coded bitstream. By implication, the most significant bits (MSB's) of the nybble are set (they are never changed) to 00 to indicate the SKIP command. In other embodiments, they can be explicitly set if necessary.

Step 440 determines if the next two pixels in the input bitstream are black starting SOLID processing. If so, then step 445 counts the number of consecutive black pixels until either 5 (the maximum for SOLID) are counted or the end of line is reached. In either event, at step 450, a nybble is output with the adjusted pixel count by subtracting 2 from the count of pixels. This adjusted count is then OR'ed with the value with 8 to indicate the SOLID command 01 into the MSB's of the nybble, and it is inserted into the coded bitstream.

If the case is neither SKIP (steps 425-435) nor SOLID (steps 440-450), then QUOTE processing is performed, steps 455-460. At step 455, the number of pixels is counted until (a) 4 pixels are counted; (b) the end of line is reached; or (c) additional SKIP or SOLID cases are determined. Then, at step 460, the QUOTE command is output with the number of counted unique pixels minus 1, OR'd with 12 (to insert the QUOTE command in the 2 MSB's of the nybble) followed by the counted number of pixels and their values packed into the counted number of nybbles.

Step 465 decrements the pixel count for the line depending on how many pixels were processed and pixel processing of the line continues at step 420 if the number of pixels remaining to be coded is greater than zero, step 470. If there are no further pixels to be processed on the line, 475 decrements the line count, and 480 determines if there are lines remaining to be processed. If so, then the process returns to step 415 for additional line processing. If not, then bitstream encode process 400 is complete at step 485.

Decoder

One embodiment of a decoder 340 of the present invention is implemented through a flow of if-then statements and loops for decoding the commands. This implementation is shown and described with reference to FIG. 5.

Decoding process 500 starts 505 by retrieving the next nybble in the coded bitstream for processing. 510 performs a check to see if the command is less than 8 indicating a SKIP. If it is a SKIP, then the decoder outputs n+2 skipped pixels into the decoded bitstream 350 according to the value of n in the second half of the nybble.

If the command is not less than 8, then step 520 performs a check to see if the value of the nybble is less than 12. This indicates a SOLID command. If so, then 525 outputs the command nybble—6 to the decoded bitstream 350.

If the command value is not less than 12, then it is assumed that the command is a QUOTE command and the QUOTE processing loop 530-550 is executed. At step 530, a counter used in the QUOTE loop is initialized to the command value—11. This is the set the number of pixels which will be reproduced with the QUOTE by stripping the QUOTE command value itself from the nybble. Then, at step 535, the pixel value for the output bitstream is set to the value of the next nybble and output to the bitstream at step 540. The counter is decremented, step 545, and it is tested to see if it now zero indicating that all of the quoted pixels have been output. If not, then the QUOTE loop returns to step 535 for more QUOTE processing. If the counter is zero, then the QUOTE loop is complete and process 500 continues.

After processing of the command with each of the three cases then it is determined whether the bitstream has reached the end of the line (e.g. end of glyph for a character). If not, then the command process returns to step 505 for processing the next nybble on the line. If so, then step 560 determines whether the bitstream is complete. If so, then the decode process is complete, step 565. If not, the process increments to the next output line in the bitstream at step 570, and returns to step 505 for further RLE decoding.

Because each command in embodiments of the present invention is stored in a nybble, another embodiment in some languages and architectures takes advantage of the fact that there are only 16 possible values in a nybble using this coding method and uses a switch. In either event, the resulting functionality (the output bitstream) is the same. A switch-based decoder may operate faster in these embodiments by eliminating many tests and loops in an if/then decoder for solid and opaque runs as shown in FIG. 5. Such a switch-based scheme is shown in the following JavaScript code segment:

```
const uint8_t solid=0xff;
uint8_t *output, *outputEnd;
do {
    uint8_t command=getNybble( );
    switch (command) {
        case 0: output+=2; break;
        case 1: output+=3; break;
        case 2: output+=4; break;
        case 3: output+=5; break;
        case 4: output+=6; break;
        case 5: output+=7; break;
        case 6: output+=8; break;
        case 7: output+=9; break;
        case 11: *output++=solid;
        case 10: *output++=solid;
        case 9: *output++=solid;
        case 8: *output++=solid;
            break;
        case 12:
        case 13:
        case 14:
        case 15:
            // output 1 to 4 quote pixels
            break;
    }
} while (output<outputEnd)
```

In either of the implementations described above, because of the relative lack of complexity of this coding scheme, encoded bitstream 500 of FIG. 5 can be decoded in realtime on a limited capacity device which implements an interpretive runtime, such as device 100. Because it can be decoded in real time, there is no need to store the decompressed image mask in RAM for rendering, even temporarily. The image mask can be read directly from ROM (e.g. 151) by the decoder as it renders.

Clipping

When the output is clipped, the packed encoding of commands simplifies the decoder implementation when scanning of encoded to reach the desired data. Consider the situation where the top three scan lines are clipped out, and so consequently will not be rendered. Rather than having to parse through each scan line individually, the implementation need only calculate the total number of pixels in the three scan lines and then invoke a function to skip that number of pixels, independently of scan lines. Similarly, when the image is clipped on both the le and right edges, skipping of opcodes between the end of one scan line and the start of the next can be performed without regard to where the scan line ends, only the total number of pixels to be skipped.

FIG. 6 shows the results of performing the coding algorithm(s) thus described. A line 605 of a glyph 600 is represented at 18 bytes. Using the techniques of the present invention, this is further reduced to 6 bytes, 610. Thus, a huge savings in memory is achieved in a compressed bitstream using the techniques of the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory computer readable medium comprising an encoded bitstream when decoded by a computer system producing an image for display, the encoded bitstream comprising any one or more of the following:
   a) a skip command stored into a single nybble, the skip command indicating how many pixels other than solid pixels which are inserted into a decoded bitstream, wherein there are at least a minimum number of transparent pixels and no more than a maximum number of transparent pixels;
   b) a solid command stored into a single nybble, the solid command indicating how many solid pixels should be inserted into the decoded bitstream, wherein there are at least a minimum number of solid pixels and no more than a maximum number of solid pixels; and
   c) a quote command stored into a single nybble, the quote command indicating how many quoted pixels should be inserted into the decoded bitstream, wherein there are no more than a maximum number of quoted pixels; and
   wherein the skip, solid or quote commands each comprises a command portion and a count portion in the single nybble, the count portion indicating how many of the pixels of the respective command encodes.

2. The computer readable medium of claim 1 wherein the maximum number of transparent pixels is 9.

3. The computer readable medium of claim 1 wherein the minimum number of transparent pixels is at least 2.

4. The computer readable medium of claim 1 wherein the maximum number of solid pixels is 5.

5. The computer readable medium of claim 4 wherein the maximum number of quoted pixels is 4.

6. The computer readable medium of claim 1 wherein the minimum number of solid pixels is at least 2.

7. The computer readable medium of claim 1 wherein the encoded bitstream further comprises pixel values after the quote command.

8. The computer readable medium of claim 7 wherein each of the pixel values is packed into a nybble.

9. The computer readable medium of claim 8 wherein a number of the pixel values is equal to a value of the count portion.

10. The computer readable medium of claim 1 wherein the maximum number of transparent pixels is greater the maximum number of solid pixels.

11. The computer readable medium of claim 1 wherein the maximum number of solid pixels is greater the maximum number of transparent pixels.

12. The computer readable medium of claim 1 wherein the pixels represent mask values.

13. An apparatus in a computing system for encoding an image to be displayed comprising an encoder capable of inserting one or more of any one of the following commands in a bitstream each stored into a single nybble on a computer readable medium in response to receiving the image to be displayed:
   a) a skip command, the skip command indicating how many transparent pixels are inserted into the bitstream, wherein there are at least a minimum number of transparent pixels and a maximum number of transparent pixels;
   b) a solid command, the solid command indicating how many solid pixels should be inserted into the decoded bitstream, wherein there are at least a minimum number of solid pixels and less than or equal to a maximum number of solid pixels; and
   c) a quote command, the quote command indicating how many quoted pixels should be inserted into the decoded bitstream; and
   wherein the skip, solid or quote commands each comprises a command portion and a count portion in the single nybble, the count portion indicating how many of the pixels of the respective command is specified.

14. The apparatus of claim 13 wherein the maximum number of transparent pixels is 9.

15. The apparatus of claim 13 wherein the minimum number of transparent pixels is at least 2.

16. The apparatus of claim 13 wherein the maximum number of solid pixels is five.

17. The apparatus of claim 13 wherein the minimum number of solid pixels is at least 2.

18. The apparatus of claim 13 wherein the maximum number of quoted pixels is 4.

19. The apparatus of claim 13 wherein the bitstream further comprises pixel values after the quote command.

20. The apparatus of claim 19 wherein a number of the pixel values is equal to a value of the count portion.

21. The apparatus of claim 13 wherein each of the pixel values is packed into a nybble.

22. The apparatus of claim 13 wherein the maximum number of transparent pixels is greater the maximum number of solid pixels.

23. The apparatus of claim 13 wherein the maximum number of solid pixels is greater the maximum number of transparent pixels.

24. The apparatus of claim 13 wherein the pixels represent mask values.

25. An apparatus in a computing system for decoding an image to be displayed comprising a decoder capable of decoding any one or more of any one of the following commands in a coded bitstream each stored in a single nybble on a computer readable medium and creating a decoded bitstream on a computer readable medium suitable for display:
   a) a skip command, the skip command indicating how many transparent pixels are inserted into the bitstream, wherein there are at least a minimum number of transparent pixels and a maximum number of transparent pixels;
   b) a solid command, the solid command indicating how many solid pixels should be inserted into the decoded bitstream, wherein there are at least a minimum number of solid pixels and less than the maximum number of solid pixels; and
   c) a quote command, the quote command indicating how many quoted pixels should be inserted into the decoded bitstream; and
   wherein the skip, solid or quote commands each comprises a command portion and a count portion in the single nybble, the count portion indicating how many of the pixels of the respective command is specified.

26. The apparatus of claim 25 wherein the maximum number of transparent pixels is 9.

27. The apparatus of claim 25 wherein the minimum number of transparent pixels is at least 2.

28. The apparatus of claim 25 wherein the maximum number of solid pixels is 5.

29. The apparatus of claim 25 wherein the minimum number of solid pixels is at least 2.

30. The apparatus of claim 25 wherein the maximum number of quoted pixels is 4.

31. The apparatus of claim 25 wherein the coded bitstream further comprises pixel values after the quote command.

32. The apparatus of claim 31 wherein each of the pixel values is packed into a nybble.

33. The apparatus of claim 32 wherein a number of the pixel values is equal to a value of the count portion.

34. The apparatus of claim 25 wherein the pixels represent mask values.

35. A method performed in a computing system for encoding an image into a bitstream stored onto a computer readable medium comprising the following steps:
   a) if a first count of pixels of the image are transparent and the first count is greater than 1 but not more than a first maximum, then storing a skip command into a first nybble in the bitstream indicating how many pixels other than solid pixels should be inserted into a decoded bitstream else;
   b) if a second count of pixels of the image are solid, and the second count is greater than 1 but not more than a second maximum and wherein the second maximum is less than the first maximum, then storing a solid command into the first nybble in the bitstream indicating how many solid pixels should be inserted into the decoded bitstream else; and
   c) if third count of pixels of the image neither transparent nor solid and the third count is no greater than a third maximum, then storing a quote command into the first nybble in the bitstream indicating how many quoted pixels should be inserted into the decoded bitstream, followed by the third count of the values of each of the pixels, each of the values of the pixels packed into at least one second nybble; and
   wherein the skip, solid or quote commands each comprises a command portion and a count portion in the first nybble, the count portion indicating how many of the pixels of the respective command is specified.

36. The method of claim 35 further comprising the step of converting each pixel value of the image to 4 bits prior to steps a-c.

37. The method of claim 35 further repeating steps a-c until there are no more pixels of the image to be encoded.

38. The method of claim 35 wherein the first maximum is equal to 9.

39. The method of claim 35 wherein the second maximum is equal to 5.

40. The method of claim 35 wherein the third maximum is equal to 4.

41. The apparatus of claim 35 wherein the pixels represent mask values.

* * * * *